United States Patent [19]

Mills

[11] Patent Number: 5,274,334
[45] Date of Patent: Dec. 28, 1993

[54] CALIBRATED PHYSICAL PARAMETER VALUE MEASUREMENT SYSTEM

[75] Inventor: Frank S. Mills, Minneapolis, Minn.

[73] Assignee: Honeywell Inc., Minneapolis, Minn.

[21] Appl. No.: 451,653

[22] Filed: Dec. 18, 1989

[51] Int. Cl.$^5$ .......................................... G01R 27/26
[52] U.S. Cl. .................... 324/678; 324/677; 324/676
[58] Field of Search ............. 324/663, 664, 676, 677, 324/678, 710–712, 601; 73/1 G, 1 R, 336.5

[56] References Cited

U.S. PATENT DOCUMENTS

| | | | |
|---|---|---|---|
| Re. 33,119 | 11/1989 | Baker | 374/102 |
| 1,758,494 | 5/1930 | Behr . | |
| 3,542,654 | 11/1970 | Orr | 29/593 |
| 4,379,406 | 4/1983 | Bennewitz et al. | 324/65 R X |
| 4,404,481 | 9/1983 | Ide et al. | 324/678 X |
| 4,563,634 | 1/1986 | Lehle | 324/677 X |
| 4,621,228 | 11/1986 | Toki et al. | 324/61 R |
| 4,633,168 | 12/1986 | Venema | 324/678 |
| 4,656,599 | 4/1987 | Knothe et al. | 364/567 |
| 4,661,768 | 4/1987 | Carusillo | 324/678 |
| 4,703,886 | 11/1987 | Kirby | 236/44 E |
| 4,706,032 | 11/1987 | Allen et al. | 324/678 X |
| 4,793,187 | 12/1988 | Kordts | 73/708 |

FOREIGN PATENT DOCUMENTS 0213727  7/1986  European Pat. Off. .
2538542  12/1982  France .

*Primary Examiner*—Jack B. Harvey
*Attorney, Agent, or Firm*—Edward Schwarz

[57] ABSTRACT

A circuit for measuring a parameter value by measuring the time required to charge a capacitor in a sensor RC circuit from a first to a second voltage includes a reference RC circuit whose capacitor is also charged between two voltage levels. The circuit is calibrated so that the time interval required to charge the reference capacitor may be used to improve the accuracy with which the parameter value is measured.

6 Claims, 4 Drawing Sheets

CALIBRATED PHYSICAL PARAMETER VALUE MEASUREMENT SYSTEM

BACKGROUND OF THE INVENTION

There are certain physical conditions or parameters whose levels must be measured with relatively good precision. For example, if the condition is some type of air pollutant for which a maximum has been established, it is important to accurately determine the level reliably and cheaply so as to allow remedial actions (which may be very expensive) whenever needed and yet not fail to take such actions either whenever required. There are other situations where these parameters are under the control of some system or device such as a HVAC (heating, ventilating and air conditioning) system where accurate measurement is necessary to reduce operating cost and yet assure occupant comfort. In this second example, it is commonly desirable to measure certain of these parameter levels with precision and to provide the measurements in electronic signals as a feedback to allow a control system to control these values with precision. Two of the most important of these parameters are relative humidity and temperature.

In electronically based parameter value measuring systems it is common to use as a sensor element an electronic component such as a resistor or capacitor whose electrical value changes with the parameter value. In particular, there are relative humidity and temperature sensor elements whose capacitance or resistance changes in a predictable manner with the change in the value of the parameter involved. It is thus possible to measure this parameter value by measuring the capacitance or resistance of the sensor element.

Measuring the capacitance or resistance of such a sensor element using only a cheap and simple circuit is not an easy job however. One common approach is to use an RC circuit incorporating the sensor component and a fixed value for the other component and measure the time required to charge the capacitor from a first to a second voltage and from this time calculate the resistance or capacitance. By knowing the relationship between the sensor component value and the parameter value to be measured, one can calculate the parameter value directly from the charging time interval. One can see that the accuracy with which the parameter value is calculated depends on the accuracy with which is measured the first and second voltage levels defining the charging time interval, accurate knowledge of the fixed component value in the RC circuit, and the stability of the timing element which measures the time interval between the two voltage levels. It is necessary if high precision is desired to eliminate all of these effects when measuring these parameter values in the manner explained.

In particular, relative humidity has been measured by using in such an RC circuit a sensor capacitor whose capacitance changes in direct proportion to the ambient relative humidity. However, the various sources of error mentioned have heretofore prevented highly accurate measurements of relative humidity using such a sensor in a conventional RC circuit.

U.S. Pat. No. 4,703,886 (Kirby) is an available reference which uses a sensor element whose capacitance changes as a function of relative humidity. U.S. Pat. No. 4,793,187 (Kordts) describes a circuit which compensates for temperature dependency in a capacitive sensor which measures various types of parameter values.

BRIEF DESCRIPTION OF THE INVENTION

It is possible by using a system designed as follows to, for the most part, eliminate the effect that variations in supply voltage, timer characteristics, manufacturing processes, and other sources have on the accuracy of parameter value measurements based on the charging interval for an RC circuit incorporating as a sensing element either a resistor or a capacitor. This system includes the usual sensor circuit including a sensor resistor and a sensor capacitor which form a sensor RC series circuit whose time constant varies as a predetermined function of the ambient air parameter value to be measured. There are means provided for periodically connecting the sensor RC series circuit between terminals of a voltage source to permit charging of the sensor capacitor with current from the voltage source which passes through the sensor resistor. A sensor capacitor voltage sensing circuit receives the voltage across the sensor capacitor while the sensor capacitor is being charged and provides a sensor signal having first and second wave form changes which are separated by a sensor time interval equal to the time interval between the instants of the sensor capacitor voltage attaining a first predetermined voltage level and sensor capacitor voltage attaining a second predetermined voltage level. The invention itself lies in an improvement in this sensor circuit which provides a signal from which may be derived increased accuracy in the measurement of the predetermined parameter value.

This improvement to the circuit includes a reference RC series circuit comprising a reference resistor and a reference capacitor each of fixed value. There are means provided for periodically connecting the reference resistor and the reference capacitor in series between the terminals of the voltage source to permit charging of the reference capacitor with current from the voltage source passing through the reference resistor. A reference voltage level sensing circuit receives the voltage across the reference capacitor and provides a reference signal having first and second waveform changes separated by a reference time interval equal to the time interval between the instants of the reference capacitor voltage attaining a third predetermined voltage level and the reference capacitor attaining a fourth predetermined voltage level.

By taking the difference between the sensor time interval and the reference time interval, and dividing this difference by the reference time interval, a value is derived which is very accurately proportional to the predetermined ambient air parameter to be measured.

For example, for certain relative humidity-sensitive polymer materials used as dielectrics in capacitors the constant of proportionality $K=0.0025$. Accordingly, the relative humidity percentage is specified with high accuracy by the formula $(t_s-t_r)/(0.0025 t_r)$. One can see that this formula is independent of absolute time durations, voltage levels, and values of the circuit components involved. Of course, circuit components should be of roughly the same magnitude so as to allow maximum accuracy in measuring the $t_s-t_r$ parameter.

In a method for manufacturing this system, one may form the sensor resistor and capacitor and the reference capacitor on a substrate using well known thick film processes. The reference resistor is also formed on this substrate with an initial resistance smaller than the resistance causing the reference time interval to substantially equal the sensor time interval at the preselected value of the predetermined parameter.

For commercial use this invention can be embodied in high precision parameter value measurement circuit which can be attached to a computer which has the capability of digitally expressing time between level transitions in voltage waveforms applied to signal inputs of the computer. The computer also must have the capability of calculating an equation having a plurality of independent variables. The high precision parameter value measurement circuit provides inputs which enable the computer to calculate the value of the predetermined parameter with precision, as a function of the times between the level transitions received by the computer's signal inputs. Such a measurement circuit includes a sensor RC circuit comprising a sensor capacitor and a sensor resistor for series connection between terminals of a voltage source of voltage V to permit charging of the sensor capacitor with current from the voltage source passing through the sensor resistor. This sensor RC circuit has at least one of its two elements sensitive to the parameter values such that the charging rate of the sensor capacitor varies as a function of a value of the predetermined parameter. There is a sensor timer circuit which receives a voltage across a sensor capacitor while the sensor capacitor is being charged and which provides the sensor signal having first and second waveform changes substantially coinciding respectively with the instants of the sensor capacitor voltage attaining a first predetermined voltage level and sensor capacitor voltage attaining a second predetermined voltage level. To correct for inaccuracy in measuring voltage level, time measurement drift, etc. there is also a reference RC circuit comprising a reference resistor and a reference capacitor of fixed value for series connection between terminals of the voltage source to permit charging of the reference capacitor with current from the voltage source. A reference timer circuit receives the voltage across the reference capacitor and provides a reference signal having first and second waveform changes which substantially coincide respectively with the instants of the reference capacitor voltage attaining a third predetermined voltage level and the reference capacitor voltage attaining a fourth predetermined voltage level.

When connected to a computer having an internal clock it is easy to measure the time between these waveform changes and thereby provide a digital value for the time required for the individual capacitors to charge between their respective predetermined voltages without the excessive processing time and expense that standard analog to digital converters imply. The computer can then calculate a high precision value of the predetermined parameter as a function of the difference between the sensor time interval and the reference time interval, divided by the product of a constant of proportionality and the reference time interval.

Accordingly, one purpose of this invention is to provide a means for accurately measuring a predetermined ambient air parameter value.

A second purpose is to permit attachment of circuitry allowing high accuracy measurement of an ambient air parameter value to a ordinary microcomputer.

Yet another purpose of this invention is to allow digital processing in the calculation of the predetermined ambient air parameter value without the necessity of a separate a/d conversion circuit.

Other purposes and advantages of this invention will become apparent in the following description.

DESCRIPTION OF THE PREFERRED EMBODIMENTS

Figure 1:
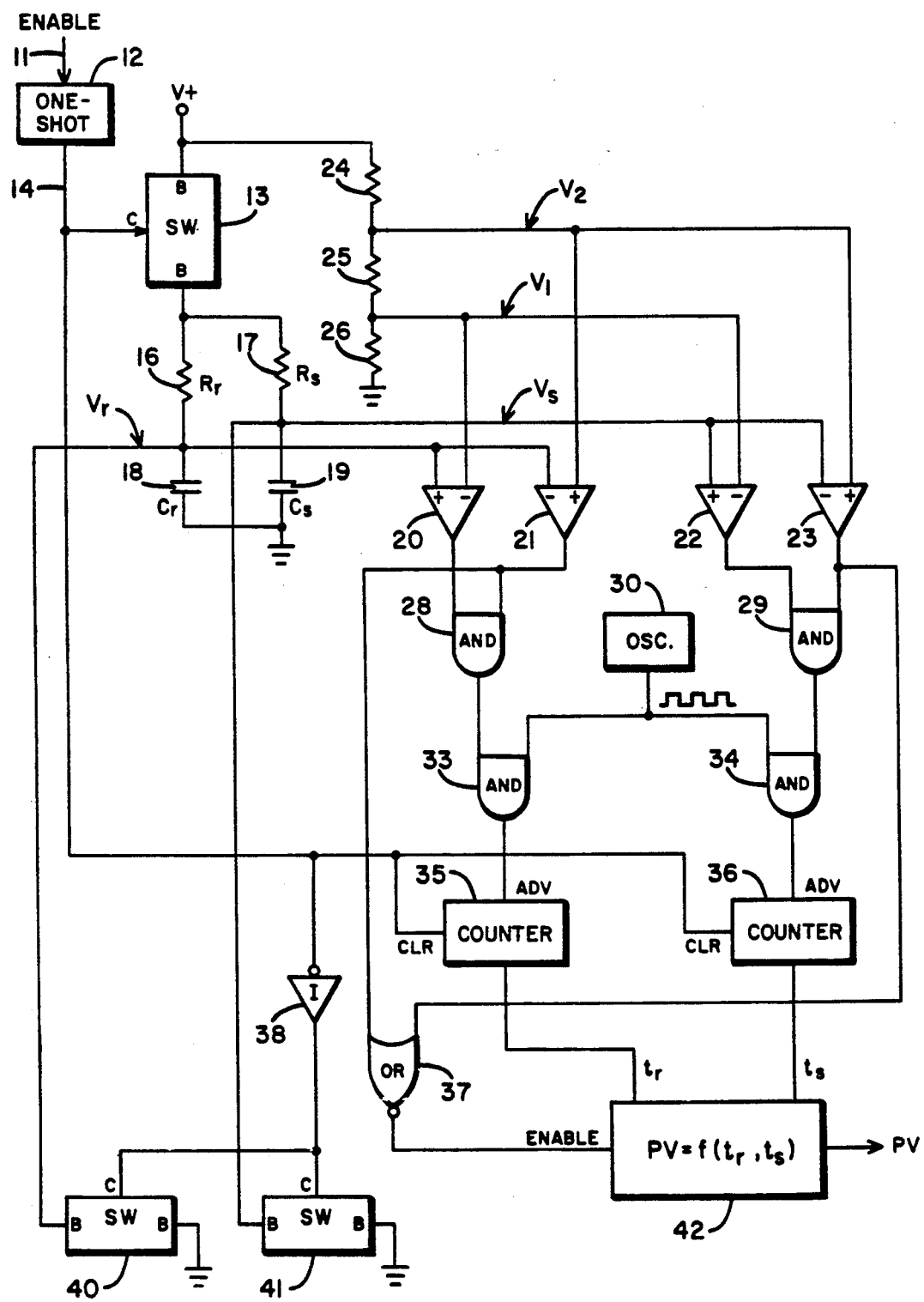
FIG. 1 is a logic block diagram of the invention.
Figure 3:
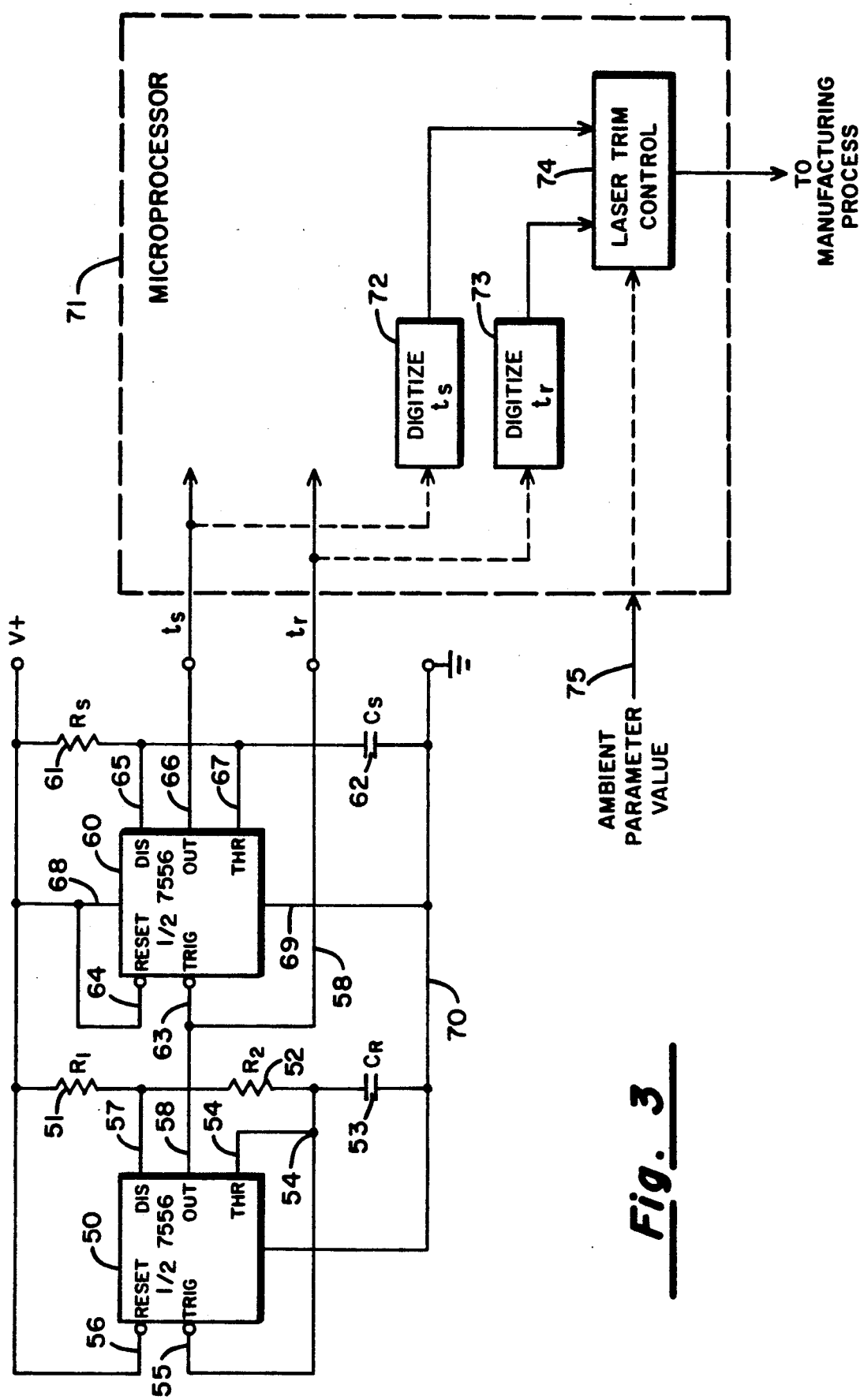
FIG. 3 discloses a specific implementation of the invention of FIG. 1, and employing off the shelf microelectronic timers and is suitable for connection to a microcomputer.

FIGS. 1 and 3 incorporate both analog and digital circuitry. For convenience's sake, supply voltages are assumed to be positive with respect to ground. For the electrical representation of Boolean values, A Boolean 1 logic level will correspond to a voltage level more positive than that of a Boolean 0 or logical low level. It should be understood that this choice for the physical representations of Boolean values is purely arbitrary. It is chosen because some logic design families use it and because it is simplest for the reader to understand. Each of the circuits shown in FIGS. 1 and 3 convert analog voltage level change rates into time intervals of length proportional to the change rates. The circuits also provide means to digitally express the length of these time intervals. The digital values may then be used by a microprocessor to perform the calculations by which the precision of the parameter value measurement is derived.

It is helpful to first discuss the theoretical considerations for this invention. The invention allows one to accurately measure a parameter whose value controls in a predictable way the time interval required to charge the capacitor in an RC circuit between two preselected voltages. In general for two parameters of particular interest, air temperature and relative humidity, for which this invention has application the value of a single one of the components in the RC circuit is affected by the change in the parameter. In both of these cases, the sensing element changes its value linearly with the change in parameter value. Hence the time interval required for a voltage source of fixed value to charge the capacitor in a RC circuit from a first to a second fixed voltage also varies linearly with the change in parameter value. Note that the capacitor voltage itself varies in the well-known logarithmic fashion, but the focus here is on the time required to charge the capacitor between the two voltages, which time varies linearly with the parameter value.

It is not necessary that the value of only one of the components in the sensor RC circuit change in response to a change in parameter value. However, if the changes in both the resistor and capacitor values are linear with the change in parameter value, then the charging time interval changes linearly. It is important that the coefficients for the resistor and capacitor value change be of opposite sign so as not to result in too small a combined coefficient in charging time. If this combined coefficient is too small, the accuracy with which the parameter value is measured will be affected. As a practical matter, analyzing and calibrating a circuit incorporating the invention is simpler where only one component value is a variable so this will be assumed to be true for the remainder of the description.

Also, linearity in the sensing element component value response to change in the parameter value is not necessary to implement this invention, but the sensing value must change monotonically with the parameter value. That is, there must be only one parameter value corresponding to each sensing element value so that each sensing element value thus yields a single parameter value. However, if the relationship between the sensing element value change and the parameter value change is assumed to be linear the application of this invention becomes substantially simpler. The invention will be described with the use of a linearly responding sensing component, but there will be occasional brief mention of how a nonlinear sensing element may also be employed.

Once a sensor RC circuit has been constructed it is necessary to calibrate it so as to determine the relationship between the charging interval and the parameter value. With the assumption of linearity, the traditional algebraic expression $y = mx + b$ applies, where y is the parameter value, m is a constant of proportionality for the sensing element, and b is a datum or baseline value for the parameter value. If the measured time interval to charge the sensor RC circuit capacitor through its voltage interval is $t_s$, the parameter value to be measured is PV, and the time interval $t_s$ changes by a factor of K time units for each unit change in the parameter value based on a datum time interval $t_o$, then the expression can be written $$PV = [(t_s - t_o)/Kt_o] + PV_o. \quad (1)$$

$PV_o$ is the parameter value which produces a charging time interval of $t_o$ for the RC circuit involved. The value of K, while a constant when assuming linearity for the sensing element, nonetheless depends on the value selected for $PV_o$. If K is not known for the particular sensing element, it can be easily determined. To do this, the ambient conditions are set at $PV_o$ and one other value, say $PV_1$, and the charging time interval measured for each ambient condition respectively as $t_o$ and $t_1$. Substituting $PV_1$ for PV and $t_1$ for $t_s$ allows K to be calculated. This value for K can be used as though it is a constant for so long as $t_o$ and its corresponding $PV_o$ is used in equation (1). If linearity cannot be assumed, then the factor $(t_s - t_o)/Kt_o$ can be replaced in the equation with whatever expression states the relationship between changes in the sensor RC circuit charging interval and the parameter value. K then becomes a variable which is a function of the sensor's characteristics and the parameter value which is to be measured, and the use of equation (1) modified accordingly.

As an example of this assume that the parameter which is to be determined is relative humidity, which as is well known, varies from 0% to 100%. In a RC circuit incorporating a humidity sensitive capacitor as the sensing element the capacitance changes from 200 pf. at 0% RH to 250 pf. at 100% RH. Experiments show that these capacitances produce charging times of 400 usec. and 500 usec. respectively for a particular charging voltage and voltage range over which the capacitor is charged. Setting $PV_o = 0\%$, $PV_1 = 100\%$, $t_o = 400$ usec., and $t_1 = 500$ usec., K is calculated from equation (1) as 0.0025 usec./usec./% relative humidity when the baseline or datum relative humidity is 0% and the resulting time interval is 400 usec. In fact, this is quite similar to the response of a particular type of relative humidity sensor capacitor having a polyimide dielectric.

It is now common for these sensors to be used in automated HVAC (heating, ventilating and air conditioning) systems. In these systems, the sensors are connected to microprocessors, and it is common for the microprocessor to which a sensor is connected to measure the charging time. In such a commercial system, it is not easy to assure that the interval over which the charging of the capacitor in an sensor RC circuit occurs can be standardized, particularly since the user supplies the timer and charging voltage source. For example, individual microprocessors or PC's may have different timer rates. The supposedly fixed component values can vary by a few percent from one circuit to another which is nominally identical, or even within an individual circuit as temperature changes, affecting the accuracy of the measurement. There are known ways to correct for or avoid some of these sources of error but others are not easy to handle with current techniques. If possible, it would be more convenient to make the operation of the circuit incorporating this means of measuring a parameter value independent of these variables by use of a compensation technique. It is this means and the associated calibration process which forms the heart of the invention to be described.

The invention involves including a calibrated reference time standard with the sensor RC circuit to allow this compensation to be made. Accordingly, a second RC circuit, the reference RC circuit, is supplied which has a calibrated time interval for charging of its capacitor between two of its own preselected voltages. The reference RC circuit is used as a standard by which any errors or differences in timer activity are accommodated. The resistance and capacitance of the reference circuit are reasonably constant over the range of the parameter value to be measured and allow such variations to be normalized to a predetermined value of K. Changes in charging time intervals of the sensor RC circuits resulting from other than changes in the parameter value are likely to be reflected in a similar change in the compensation or reference circuit as well, and the invention allows this effect to cancel the errors which otherwise will result.

To desensitize both circuits from the effects of variations in charging voltage and the voltage levels defining the charging voltage interval, it is convenient to use a voltage divider which provides each of the preselected voltages defining the charging interval as a fixed fraction of the charging voltage. If this is done, then changes in the charging voltage will affect the charging interval pro rata and the actual time interval during which the reference capacitor is charged from the first to the second of the preselected charging interval. It is not necessary that the sensor and reference circuit capacitors be charged between the same pair of voltages, so different sets of voltage dividers may be used to supply the pairs of voltages defining the voltage ranges for each of the reference circuit and the sensor circuit, as long as each capacitor receive the voltage applied to the voltage divider providing the voltage levels defining the capacitor's charging interval. The use of voltage dividers to provide from the capacitor charging source the voltage interval over which the capacitor charging is timed, is a well known practice.

To use such a reference RC circuit, it is necessary to calibrate the sensor RC circuit to the reference RC circuit or vice versa, and this is believed to be one area of patentable subject matter. This calibration is accomplished during the manufacturing operation. There are a number of different ways in which the calibration may be done, but all rely on measuring the time interval for both the sensor and the reference RC circuits. If the measured charging time interval for the reference circuit is $t_r$, then it is preferred that $t_r = t_o$, where $t_o$ is the sensor time interval when the measured parameter value is $PV_o$ as explained above. This is because, as mentioned above, the constant K is valid only for the datum parameter value $PV_o$ and its associated datum time interval $t_o$. Setting $t_r = t_o$ may be done by either altering the component values of the sensor RC circuit, the reference RC circuit, or both. In theory, which of these operations is used is irrelevant, but in a thick film manufacturing operation, it is most convenient to alter both of the RC circuits using computer guided laser trimming of the resistors which are created in situ on the circuit board. It is also possible to alter the capacitor values, say by trimming one or both of the capacitors, or by using a manually adjustable discrete capacitor in either RC circuit. It is also possible to use manually adjustable discrete resistors in the RC circuits. The technology for trimming capacitors in thick film circuits is not well developed at this time so this approach is not favored. The use of adjustable capacitors or resistors is possible but the manual adjustment aspect has quality and cost problems which computer controlled laser trimming avoids. Therefore at this time it is preferable to adjust the charging time intervals of these circuits only by trimming either or both of the circuits' resistors to increase their resistance. Note that trimming a resistor increases the charging time interval, so by trimming one or the other of the resistors, the shorter interval may be lengthened to be equal to the longer. However, if the resistor in the sensor circuit is the sensing element and is not of a type which is trimmable, then the manufacturing process must be controlled so that the reference time interval $t_r$ is always smaller initially than the sensor time interval $t_s$.

Once the RC circuit components have been calibrated as stated then formula (1) can be rewritten to reflect the parameter value as a function of the terms K, $t_r$, and $t_s$:

$$PV = [(t_s - t_r)/Kt_r] + PV_o \qquad (2)$$

An example of how this is implemented may be helpful. In this example, each RC circuit has associated with it a voltage divider network which provides the voltages defining the charging interval. Assume that the parameter whose value is to be measured is relative humidity which, as is well known varies from 0% to 100%. For a certain humidity sensing capacitor, it is known that its capacitance changes by 23 parts per 10000 at 0% relative humidity for each percent change in relative humidity. That is, if ambient relative humidity changes from 0% to 1% (or from 49% to 50%), the capacitance of the sensor increases by 23 pf. per 10000 pf. of capacitance in the sensing capacitor at 0% relative humidity. Thus $K = 0.0023$ pf./pf./% relative humidity. Let us further assume that ambient relative humidity $RH_a$ in the facility in which calibration is to be done is measured at a given instant to be 72%. Since the value for K at 0% relative humidity is already known, it is easiest to select the datum relative humidity $RH_o$ to be 0%. In order to achieve maximum generality, the following discussion assumes that it is equally easy to increase or decrease the component values of both the capacitors and the resistors, although as mentioned above, the present state of technology makes automated trimming of the resistors as the sole means of changing the charging intervals strongly preferred.

After the two RC circuits have been fabricated the charging time interval for each is measured using the same voltage to charge the capacitors that supplies the voltage divider networks from which are derived the voltage ranges defining the beginning and end of each time interval. Assume that measurements using a counter having a stable counting rate result in $t_r = 390$ counts and $t_s = 427$ counts. $t_r$ of course will not change for this counter unless the reference RC circuit itself is physically altered. However, each individual reference circuit will have a different $t_r$ due to variations in the fabrication process and even in the calibration instrumentation. $t_s$ will change whenever ambient relative humidity changes as well as when the sensor RC circuit is physically altered, but for the few minutes during a calibration procedure, relative humidity can be taken as constant.

The formula $$t_o = t_s/[(RH_s - RH_o)K + 1] \qquad (3)$$

is derived from formula (1) above where the parameter value (PV) is relative humidity (RH). In both of these formulas $t_o$ specifies the counts which would be registered if the ambient relative humidity were the datum relative humidity, 0% in this case. It is much easier to calculate the number of counts (timer interval) for 0% relative humidity than to control the ambient relative humidity to 0%. Inserting the known values for $RH_s$, $RH_o$, and K in formula 2 yields $t_o = 347$ counts.

At this point in the process, one or more of the following steps may be taken: slightly reducing either or both of the reference circuit resistor or capacitor values or slightly increasing either or both of the sensor circuit capacitor and resistor values. The time interval $t_r$ is then remeasured, or $t_s$ is remeasured and $t_o$ recalculated for whichever of the circuits are changed. This process continues until $t_r = t_o$, or at least until the two time intervals are within a preselected range of each other, preferably 1% or less.

Whichever of these steps is (are) selected depends on the considerations applying to the particular process and the RC circuit components involved as is mentioned above. It must be realized that the above procedure can be used exactly as exemplified only when the calculated value for $t_o$ is smaller than $t_r$. If the opposite is true then the alterations to the component values must be exactly opposite as well so as to accomplish at least one of reducing the calculated $t_o$ or increasing the measured $t_r$. As mentioned, it is often possible and desirable to control the manufacturing process so that initially $t_o < t_r$ (or vice versa) is always true.

When fabricating these RC circuit components for a relative humidity sensor using a thick film technique, it is convenient to make both resistors and the sensor capacitor in situ with a deposition technique, and a discrete reference capacitor component. When using a laser trimming process for altering the values of such components to calibrate the device, present technology allows only the two resistor values can be changed. The resistors can only be increased in value by trimming, which has the effect of increasing the charging interval for the associated capacitor. These factors typically dictate how the calibration procedure will be done. The inventor knows that those with ordinary skill in the art are familiar with the details of such processes, and can easily apply these skills to implement the invention.

With the preceding analysis in mind, FIG. 1, which broadly discloses a circuit embodying this invention, can be more easily explained. FIG. 1 includes a one-shot 12 whose output to a switch element 13 on path 14 is set to a Boolean 1 for a preselected period of time in response to a transition from Boolean 0 to Boolean 1 on an enable input path 11. The signal transition on path 11 is externally provided by the user system which may include a computer or microprocessor which directs the circuitry of FIG. 1 to generate the output signals containing the information from which may be calculated the precision parameter value. The duration of the Boolean 1 portions of the output waveform from one-shot 12 depends strictly on the one-shot's preselected internal characteristics, and must be long enough to allow both capacitors 18 and 19 to charge to voltage $V_2$. For typical component values in this circuit a duration of a few hundred microseconds is appropriate. According as a Boolean 0 or 1 is present on path 14, switch 13 has an open or closed state which respectively disconnects or connects a positive voltage V+ from a voltage source to resistors 16 and 17, respectively of values $R_r$ and $R_s$. A Boolean 1 provided by one-shot 12 to switch 13 thus applies voltage V+ through resistors 16 and 17 to capacitors 18 and 19 of respective values $C_r$ and $C_s$. One can see that when a Boolean 1 is present on path 14, the voltage V+ thereby charges the capacitors 18 and 19, increasing the voltage across each of them at rates dependent on the values of these four components as well as V+. The instantaneous values of these voltages are shown as the waveforms 46 and 48 in FIG. 2.

In the circuit of FIG. 1 there are two pairs of operational amplifiers, the first pair comprising amplifiers 20 and 21 and the second pair amplifiers 22 and 23. Amplifiers 20 and 21 receive the voltage $V_r$ across reference capacitor 18 at their + and − input terminals respectively. Operational amplifiers such as these provide a Boolean 0 output whenever a signal voltage applied to the + input terminal is less positive than the voltage applied to the − input terminal, and a Boolean 1 output when the + input terminal signal voltage is more positive than that of the − input terminal voltage. A voltage divider network comprising resistors 24, 25, and 26 receives voltage V+ from the voltage supply and supplies a first predetermined reference voltage $V_1$ to the − input terminal of amplifier 20 and a second predetermined reference voltage $V_2 > V_1$ to the + input terminal of amplifier 21. It is not absolutely essential that $V_1$ and $V_2$ are supplied from the voltage V+ by a voltage divider network, but doing so is strongly preferred because the charging intervals measured by the circuitry are then insensitive to the value of V+.

Accordingly, it can be seen that while capacitor 18 is charging and voltage $V_r$ increases, the output of amplifier 20 is a Boolean 0 until voltage $V_r$ reaches voltage $V_1$ at which point the output of amplifier 20 becomes a Boolean 1. This output stays at the Boolean 1 level until voltage $V_r$ again falls below that of voltage $V_1$. Similarly, the output of amplifier 21 changes from a Boolean 0 to a Boolean 1 when the voltage $V_r$ becomes more positive than the second predetermined voltage $V_2$ and changes back to a Boolean 0 when $V_r$ becomes less than $V_2$. AND gate 28 receives the outputs from amplifiers 20 and 21. As can be seen from waveform 64 in FIG. 2, AND gate 28 provides a Boolean 1 at its output when $V_1 > V_r > V_2$ is true and a Boolean 0 otherwise. The waveform segment 47a can be seen as having a transition from Boolean 0 to Boolean 1 at approximately time 1.5 and back to Boolean 0 at approximately time 6.4, yielding a charging time $t_r$ for capacitor 18 between $V_1$ and $V_2$ of approximately 4.9.

The actual parameter value to be measured causes the time constant of the sensor RC circuit comprising capacitor 19 and resistor 17, to vary dependent on the ambient parameter value. To accomplish this, the components of this sensor RC circuit are chosen to such that the value of at least one of them will change with the parameter value to cause the time constant to thus change. In the designs now preferred, only one of the resistor and capacitor components in the sensor RC circuit is sensitive to parameter value, the value of the other component being fixed. This is preferred because it simplifies the design.

Figure 2:
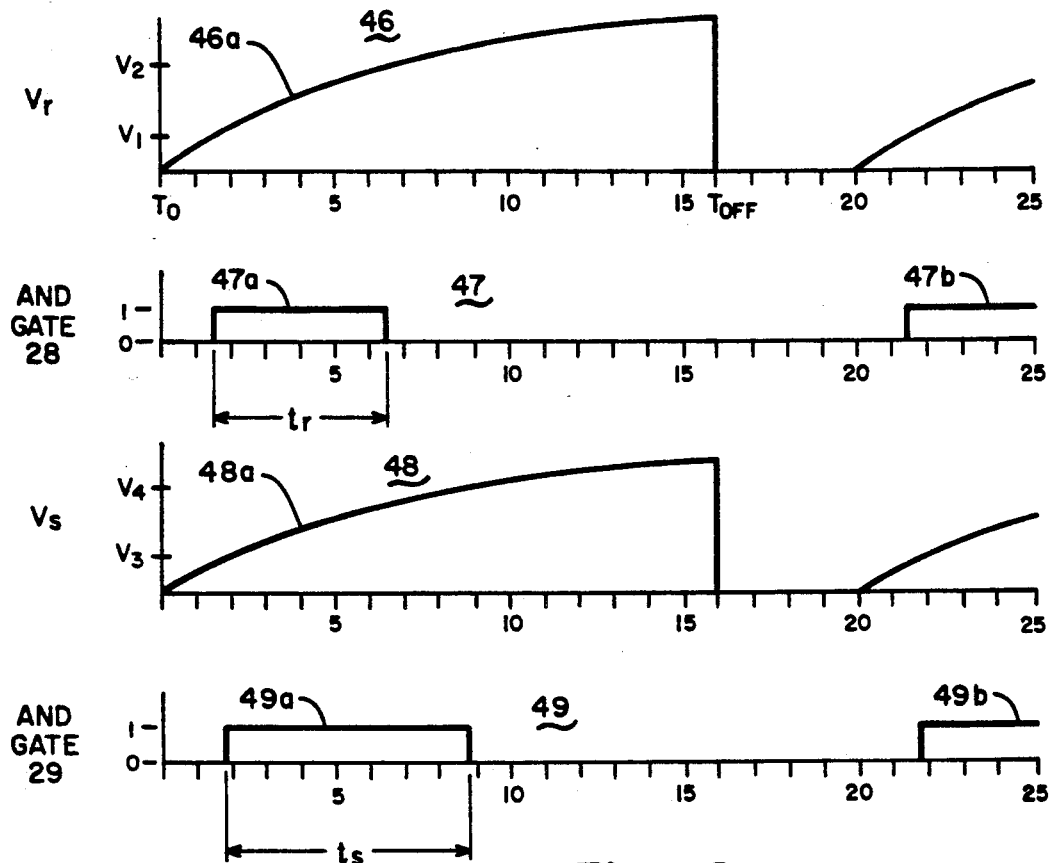
FIG. 2 shows four waveforms sharing a common time base and which are helpful in understanding the operation of the schematic of FIG. 1.

Capacitor 19 is also being charged by the current passed through resistor 19 and switch 13 from voltage source V+. Voltage $V_s$, the voltage across capacitor 19, is applied to the + input terminal of amplifier 22 and the − input terminal of amplifier 23. Voltages $V_1$ and $V_2$ are applied to the − input terminal of amplifier 22 and the + input terminal of amplifier 23 respectively. Voltage $V_s$ is shown in FIG. 2 as waveform 48, whose segment 48a can be seen crossing voltage $V_1$ at approximately time 1.8, and preselected voltage $V_2$ at approximately time 8.7 yielding a sensor time interval $t_s = 6.9$. The processing of voltage $V_s$ performed by amplifiers 22 and 23 and AND gate 29 is similar to that provided for voltage $V_r$ in that AND gate 29 receives the outputs of amplifiers 22 and 23 and provides a Boolean 1 signal when $V_1 > V_s > V_2$ is true and a Boolean 0 otherwise, see waveform 49 of FIG. 2 and particularly segment 49a thereof.

While the same pair of voltages, $V_1$ and $V_2$ are shown as defining the charging interval $t_s$ of the sensor RC circuit as for the reference RC circuit, it is entirely possible that a different pair of voltages, say voltages $V_3$ and $V_4$, may be used to define this interval. However, it is extremely important for their values to be linearly dependent on the charging voltage for capacitors 18 and 19 so as to render the circuit's operation insensitive to changes in the voltage V+. Indeed, in the commercial circuit embodiment of FIG. 3, the lower voltage defining the sensor timer interval is chosen to be 0 v. and the higher voltage to be $V_2$.

AND gates 33 and 34 receive respectively the outputs of AND gates 28 and 29 as one input. An oscillator 30 supplies a square wave signal output at a stable and known rate as a second input to each of AND gates 33 and 34. Oscillator 30 is designed to provide an output signal having a large number of cycles during the typical length of a waveform segment 47a or 49a generated by AND gate 28 or 29. The number of complete cycles from oscillator 30 which occur between the leading and trailing edges of each segment of waveforms 47 and 49 is thus a measure of the time interval occupied by the waveform segment involved. For intervals of a nominal few hundred microseconds for the durations $t_r$ and $t_s$ of waveform segments 47a and 49a, it is convenient for oscillator 30 to run with 1 microsecond cycles, although one of the important advantages of the invention is that the accuracy with which the parameter value is determined is substantially unaffected by even changes of several percent in the clock rate of oscillator 30 as long as the changes do not occur within the short time required to measure these time intervals.

The output of AND gates 33 and 34 comprises the oscillator 30 output signal between the leading and trailing edges of waveform segments 47a and 49a respectively and those following, i.e. times $t_r$ and $t_s$. Counters 35 and 36 receive the output of AND gates 33 and 34 and increment the value respectively stored within each of them by 1 for each oscillator 30 cycle gated to them by AND gates 33 and 34. It is convenient to clear counters 35 and 36 initially with the leading edge of each pulse on path 14 from one-shot 12, which is also used to close switch 13.

While oscillator 30 and counters 35 and 36 have been shown as discrete components, it is convenient to in fact use the clock and counting capabilities of a personal computer or a microprocessor which has a system oscillator and input ports which can receive waveforms 47 and 49. The precise time at which the leading and trailing edge of each waveform segment 47a, 49a, 47b, 49b, etc. occurs can be recorded by use of an interrupt function, and the difference between these two times digitally expresses the duration of the time intervals $t_r$ and $t_s$.

OR gate 37 receives the output of amplifiers 21 and 23 which indicate by a Boolean 0 output when both capacitor 18 and 19 voltages $V_r$ and $V_s$ have crossed $V_2$ and that both $t_r$ and $t_s$ have been digitally expressed as the contents of counters 35 and 36 respectively. OR gate 37 is of the inverting output type as indicated by the small circle at the output, so that when both inputs are Boolean 0's then the output becomes a Boolean 1 which indicates that the values for $t_r$ and $t_s$ are available in the counters. Responsive to the Boolean 1 output from OR gate 37, a computational element 42 computes a precise value PV for the predetermined parameter as a function of $t_s$ and $t_r$. Where there is a linear relationship between the change in the interval $t_s$ and the parameter value, and the datum value $PV_o$ has been determined, then the functional relationship is given by formula (2) above and depends on the value of K as well. Computational element 42 as well as OR gate 37 will typically also form a part of a computer or microprocessor of which oscillator 30 and counters 35 and 36 are a part.

Once the circuit has been calibrated as described above, it is virtually insensitive to differences in the frequency of oscillator 30 and variations in the RC circuits' component values which affect the values equally. This is because changes in either of these factors will affect the reference RC series circuit (resistor 16 and capacitor 18) charging time in a way identical to the effect on the sensor RC series circuit. If temperature-driven changes increase the resistor 16 and 17 values, the charging rate for both capacitors decreases proportionately increasing the measured time for each circuit, but leaving their ratio unchanged. The calculated parameter value is thus unaffected. If the frequency of oscillator 30 changes it will change for both the reference time interval and the sensor time interval essentially identically. These effects (or better, lack of effects) result because whatever changes occur will affect each RC circuit equivalently.

While the actual values selected for the components of the two RC circuits are selectable according to the designer's preference, it is convenient in certain applications to set the reference capacitor 18 value equal to the sensor capacitor 19 value for some preselected parameter value and the charging resistor 16 and 17 values close to each other. This allows counters of similar size to be used and minimizes error. In one embodiment of this invention for measuring relative humidity, the sensor capacitor value $C_s$ varies from 200 pf. at 0% RH to 250 pf. at 100%. The reference capacitor value $C_r$ is accordingly set to approximately 200 pf. and the value $R_r$ adjusted to cause $t_r = t_s$ when relative humidity is 0%.

A last detail is to provide for periodic discharging of capacitors 18 and 19. The signal produced by one-shot 12 is received by inverter element 38, whose output is the input to the control terminals of switches 40 and 41. When the trailing edge of a pulse from one-shot 12 changes from Boolean 1 to Boolean 0 the output of inverter 38 changes from Boolean 0 to Boolean 1, enabling switches 40 and 41 which connect the signal side of capacitors 18 and 19 to ground. Switches 40 and 41 are similar to switch 13, connecting their respective capacitor 18 or 19 terminals to ground when a logical 1 is present from inverter 38. By discharging capacitors 18 and 19 their signal voltages $V_r$ and $V_s$ are reduced to 0 preparatory to the next measurement cycle. To prevent premature discharge of capacitors 18 and 19, it is necessary that the duration of the output Boolean 1 waveforms from one-shot 12 be sufficiently long to assure that both $V_r$ and $V_s$ reach $V_2$.

FIG. 3 shows a preferred embodiment of the circuit of FIG. 1 for use with a computer or microprocessor. The circuit of FIG. 3 employs a 7556 general purpose timer which is available from GE Intersil in a dual package with two identical timers in one discrete microcircuit. These timers are shown with ref. nos. 50 and 60 in FIG. 3. This microcircuit is described in the GE Intersil publication *Component Data Catalog*, pp. 7-123 to 7-129, dated 1986, which pages are incorporated by reference into this specification. Each timer 50 or 60 is intended to be used with an external resistor and capacitor in a series RC circuit which provides the timing function. Each timer receives the capacitor voltage at its threshold input 54 or 67, senses the voltage, and provides an output on path 58 or 66 dependent on the voltage of the capacitor attached to the timer. Timer 50 measures $t_r$ for the reference RC circuit and timer 60 measures $t_s$ for the sensor RC circuit. In addition, timer 50 provides a second function of sequencing the alternate charging and discharging of the reference and sensor capacitors, in essence providing an approximation of the function of one-shot 12 in the circuit of FIG. 1. Each of these 7556 timers 50 and 60 include a pair of operational amplifiers similar to amplifiers 20 and 21 or 22 and 23 from FIG. 1. Each one of a 7556 timer includes a voltage divider resistor string corresponding to resistors 24, 25, and 26 of FIG. 1 and which provide similar preselected voltages with which to compare the capacitor voltage. In each 7556 timer, these voltage levels are selected to be V/3 and 2V/3 where V is the positive supply voltage V+ on path 56 of FIG. 3. V/3 and 2V/3 respectively of these 7556 timers can be considered the equivalent of $V_1$ and $V_2$ from FIG. 1. Further, each 7556 timer has the inherent capability of discharging the external capacitor when the capacitor voltage reaches 2V/3. The discharge functions are shown in FIG. 3 as provided on conductor paths 57 and 65. When the threshold value from the associated capacitor 53 or 62 provided on path 54 or 67 reaches 2V/3 the discharge function is enabled grounding discharge path 57 or 65.

To assist in explaining the operation of these 7556 timers the relevant parts of the truth table from the above-mentioned publication is reproduced:

| THRESHOLD VOLTAGE | TRIGGER VOLTAGE | RESET | OUTPUT | DISCHARGE SWITCH |
|---|---|---|---|---|
| $> \frac{2}{3}(V^+)$ | $> \frac{1}{3}(V^+)$ | HIGH | LOW | On |
| $V_{TH} < \frac{2}{3}$ | $V_{TR} > \frac{1}{3}$ | HIGH | Stable | Stable |
| Don't Care | $< \frac{1}{3}(V^+)$ | HIGH | HIGH | Off |

The term HIGH is equivalent to a Boolean 1 and the term LOW is the equivalent of a Boolean 0. It should be understood that if the trigger and threshold inputs conflict in terms of the truth table output value specified, the timer circuit honors the trigger input signal in setting both the output signal and the discharge switch.

Figure 5:
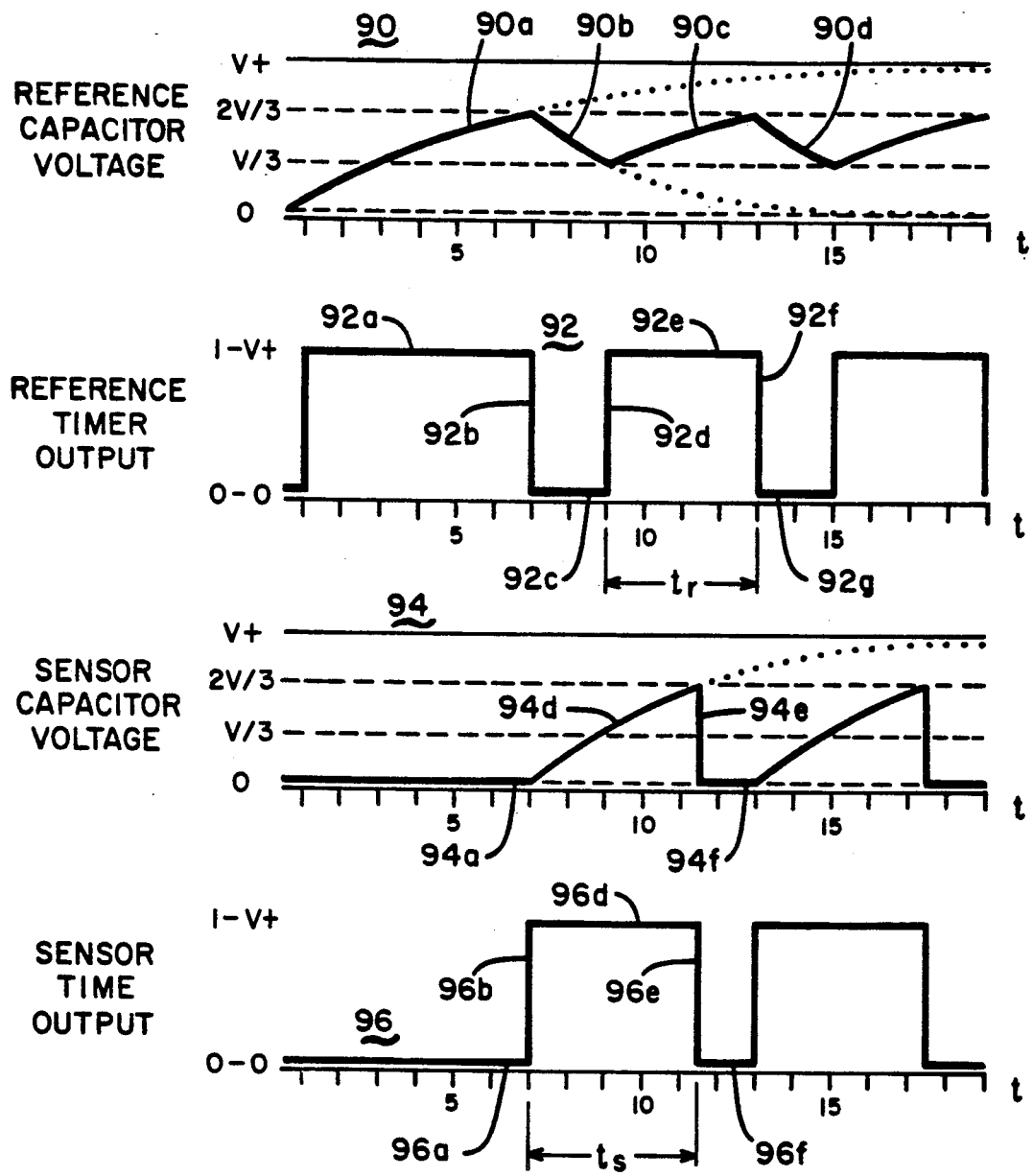
FIG. 5 shows four waveforms sharing a common time base and which are helpful in understanding the operation of the circuit of FIG. 3.

FIG. 5 depicts waveforms 90 and 94 of the voltages produced across capacitors 53 and 62 respectively and waveforms 92 and 96 of the voltages carried on the output paths 58 and 66 respectively for timers 50 and 60. The supply voltage V+ (or a semiconductor junction drop below V+) functions as a Boolean or logical 1 level, and ground (or a semiconductor junction drop above ground) as a Boolean or logical 0. During operation the supply voltage is constantly applied to the inverting reset inputs of both timers 50 and 60 on paths 56 and 64 respectively, which essentially disables the operation of these inputs. No further notice need be taken of these inputs.

When power is initially applied to the circuit of FIG. 3, both capacitor voltages are 0 v. The voltage of capacitor 53 is applied to both the inverting trigger input 55 and the threshold input 54. This capacitor 53 voltage being 0 v., the discharge switch of timer 50 is off as the truth table specifies and does not ground path 57. Therefore the voltage supply charges capacitor 53 through the resistors 51 and 52 causing the capacitor 53 voltage to steadily increase as shown by the waveform portion 90a in FIG. 5. This voltage is applied to the inverting trigger input 55 as well as the threshold input 54, and until the capacitor 53 voltage reaches 2V/3, no change in the condition of the timer 50 discharge switch connecting path 57 to ground occurs. This is because, as shown in the truth table, until the capacitor 53 voltage on input 55 reaches V/3, the discharge switch is off, and when the capacitor voltage on inverting trigger input 55 voltage is between V/3 and 2V/3 the discharge switch is stable, i.e. does not change. During this time the output signal on path 58 from timer 50 is HIGH Boolean 1 as also shown in the truth table.

When the voltage on path 54 reaches 2/V3 at approximately time 7 on waveform 90, the discharge switch of timer 50 changes to its on or closed condition grounding terminal 57 and causing capacitor 53 to begin discharging through resistor 52 to ground. This discharging is shown by the decreasing voltage of waveform portion 90b. When capacitor 53 voltage reaches 2/V3 the output signal voltage on path 58 also changes from a Boolean 1 to a Boolean 0 (HIGH to LOW), this transition being shown as segment 92b of the timer output waveform 92.

The voltage across capacitor 53 continues to decrease until when the voltage reaches V/3 at approximately time 9, the output path 58 voltage changes to a HIGH and the discharge switch path 57 is disconnected from ground allowing capacitor 53 to charge again through resistors 51 and 52 until capacitor 53 voltage again reaches 2/V3 and the discharge switch and output signals for timer 50 again change. This cycle of capacitor 53 charging and discharging and its voltage swinging between V/3 and 2/V3 continues indefinitely as long as power is applied to the circuit. At the same time, the output signal voltage on path 58 cycles between Boolean 1 (HIGH) when the capacitor 53 voltage is increasing and Boolean 0 (LOW) when the capacitor voltage is decreasing. A complete such cycle comprises waveform segments 92b, 92c, 92d, and 92e.

The output signal of timer 50 on path 58 is applied to the inverting trigger input of timer 60. The start of the cycle when the signal on path 58/63 is a HIGH Boolean 1 causes the discharge switch of timer 60 to be closed (on) preventing any charging of sensor capacitor 62 through resistor 61. This situation continues until the voltage of the reference capacitor 53 reaches 2/V3 and the signal on path 58/63 becomes a Boolean 0 (LOW), at which time the discharge switch opens and capacitor 62 begins to charge from voltage supply V+ through resistor 61. The HIGH to LOW input at the inverting trigger terminal 63 corresponding to waveform transition 92b of the timer 50 output also causes the output of timer 60 to change from LOW Boolean 0 to HIGH Boolean 1, and this transition is shown as waveform segment 96b and the continuing Boolean 1 as segment 96d.

As voltage V+ charges capacitor 62 the voltage across it steadily increases, and is applied to threshold input 67 of timer 60. When the capacitor 62 voltage at the threshold input of timer 60 reaches 2/V3, the timer output on path 66 changes from HIGH Boolean 1 to LOW Boolean 0, and this transition comprises waveform segment 96e. The discharge switch of timer 60 also is changed from open to closed when the threshold voltage on path 67 reaches 2V/3, grounding path 65 and discharging capacitor 62 rapidly along the waveform segment 94e. The discharge switch is held closed until the output of timer 50 on path 58 changes from HIGH to LOW at transition 92b or 92f, changing the inverting trigger input 63 to timer 60 to again allow capacitor 62 to charge. All of these responses are shown in the truth table.

Thus it can be seen that capacitor 53 is allowed to charge through resistors 51 and 52 at a rate governed by the voltage V+ and the component values $R_1$, $R_2$ and $C_r$ and discharge at a rate governed by the voltage V+ and the component values for $R_2$ and $C_r$. The time between waveform transitions 92d and 92f when capacitor 53 is charging is shown as time $t_r$.

Capacitor 62 charges at a rate governed by the voltage V+, the resistance $R_s$ of resistor 61 and the capacitance of sensor capacitor 62. The time between waveform transitions 96b and 96e when sensor capacitor 62 is charging is shown as time $t_s$. It can be seen that $t_s$ is directly proportional to the capacitance of capacitor 62. $t_r$ and $t_s$ can be used directly in the formulas (2) and (3) specified earlier for purposes of measuring the parameter value affecting the capacitance of capacitor 62 and calibrating the circuit for accurate measurement.

The value $R_2$ of resistor 52 through which the discharge current from the reference capacitor 53 flows is selected to cause the sum of the charge and discharge times of the reference capacitor 53, from waveform transition 92b to transition 92f for example, to exceed the charging time of the sensor capacitor, from transition 96b to transition 96e. In general, when selecting the values for the resistors and capacitors in these RC circuits it is important that they be chosen so that time between successive reference waveform transitions 92b, 92f, etc. from Boolean 1 to Boolean 0 be longer than $t_s$ so that a discharge transition segment 96e does not occur before the capacitor 62 voltage reaches 2V/3.

Figure 4:
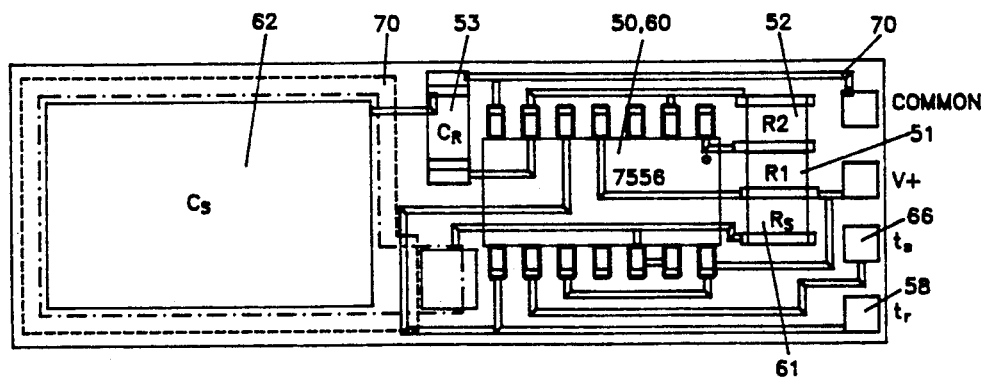
FIG. 4 shows the circuit of FIG. 3 embodied on a printed circuit board.

The outputs of the two timers 50 and 60 may be applied to a microprocessor 71 as interrupt signals which digitizer elements 72 and 73 can convert to digital and supply to a control element 74 for laser trimming of the resistors or capacitors in the circuit. The ambient parameter value must be measured independently FIG. 4 shows a circuit in magnified layout for a preferred embodiment where the individual resistors 51, 52 and 61 and capacitor 62 are formed in situ and are laid out in a way facilitating laser trimming. The details of the conductor paths are not relevant to this invention. The discussion at the start of the detailed description is specifically applicable to calibration of such an embodiment.

Having thus described an invention which I wish to protect by United States letters patent, what I claim is:

1. A method for manufacturing a high precision parameter value measurement system providing a signal encoding the value of a predetermined parameter, said system including a sensor resistor and a sensor capacitor forming a sensor RC series circuit whose time constant changes approximately linearly with a constant of proportionality K when measuring change in the predetermined parameter's value, and a reference RC series circuit comprising a reference resistor and a reference capacitor, comprising the steps of
  a) forming the components of the sensor RC series circuit and the reference RC series circuit on a substrate, said reference RC series circuit when formed having a reference time constant substantially different from that of the sensor time constant at a preselected value of the predetermined parameter; then
  b) applying voltage across the reference RC series circuit and across the sensor RC circuit from a voltage source;
  c) measuring the time between the reference capacitor voltage crossing third and fourth predetermined voltage levels and recording this time as a measured reference time interval $t_r$;
  d) with the sensor RC series circuit, sensing a local value of the predetermined parameter and measuring the time between the sensor capacitor voltage crossing first and second predetermined voltage levels, and recording this time as a measured sensor time interval $t_s$;
  e) independently measuring and recording the predetermined parameter's local value to be $PV_o$;
  f) calculating a calibration reference time interval as a function of the measured sensor time interval $t_s$ divided by the product of the constant of proportionality K and the ambient value of the predetermined parameter $PV_o$; and
  g) altering the reference resistor to change its resistance responsive to the measured reference time interval $t_r$ being unequal to the calibration reference time interval.

2. A method for calibrating a high precision parameter value measurement system providing a signal encoding the value of a predetermined parameter, said system including a sensor circuit including a sensor resistor and a sensor capacitor forming a sensor RC series circuit whose time constant varies as a predetermined function of the predetermined parameter's value, a voltage source, and a reference RC series circuit comprising a reference resistor and a reference capacitor, comprising the steps of
  a) independently measuring the parameter in the vicinity of the sensor RC series circuit, and recording the parameter value as $PV_s$;
  b) with the voltage source, charging the capacitor in the reference RC series circuit from a first to a second predetermined voltage through the reference resistor and the capacitor in the sensor RC series circuit from a third to a fourth predetermined voltage;
  c) recording the sensor time interval as a value $t_s$ and the reference time interval as a value $t_r$; and
  d) altering the value of the reference circuit components so as to cause the value $t_r$ to substantially equal $t_s/((PV_s - PV_o)K + 1)$, where $PV_o$ is a predetermined datum parameter value and K is a predetermined constant of proportionality for the sensor RC series circuit.

3. The process of claim 2, and further including the step of forming the reference and sensor RC series circuits with component values of the reference RC series circuit yielding a reference time interval less than the sensor time interval at the datum parameter value; and wherein the component value altering step includes trimming the reference RC series circuit resistor.

4. A method for the manufacturing a high precision relative humidity measurement system providing a signal encoding the value of ambient relative humidity, said system including a sensor resistor and a sensor capacitor forming a sensor RC series circuit whose time constant changes approximately linearly with a constant of proportionality K when measuring change in the ambient relative humidity value, and a reference RC series circuit comprising a reference resistor and a reference capacitor, comprising the steps of
  a) forming the components of the sensor RC series circuit and the reference RC series circuit on a substrate, said reference RC series circuit when formed having a reference time constant different from that of the sensor RC circuit time constant at a preselected value of the predetermined parameter;
  b) independently measuring the relative humidity $RH_s$ in the vicinity of the sensor RC series circuit and recording the measurement as $RH_s$;
  c) connecting the voltage source across the RC circuits to charge the capacitors in the reference and sensor RC series circuits respectively from a first to a second predetermined voltage and from a third to a fourth predetermined voltage, and
  d) altering the value of the reference circuit components so as to cause the value $t_r$ to substantially equal $t_s/((RH_s - RH_o)K + 1)$, where $RH_o$ is a predetermined datum relative humidity value.

5. The process of claim 4, and further including the step of forming the reference and sensor RC series circuits with component values of the reference RC series circuit yielding a reference time interval less than the sensor time interval at the datum relative humidity value; and wherein the component value altering step includes trimming the reference RC series circuit resistor.

6. The process of claim 5, wherein the component altering step includes the step of selecting the datum relative humidity value equal to 0%.

* * * * *

UNITED STATES PATENT AND TRADEMARK OFFICE
CERTIFICATE OF CORRECTION

PATENT NO. : 5,274,334
DATED : Dec. 28, 1993
INVENTOR(S) : FRANK S. MILLS

It is certified that error appears in the above-identified patent and that said Letters Patent is hereby corrected as shown below:

Column 16, line 52, add /after "recording the time required to thusly charge the sensor capacitor as a sensor time interval value $t_s$ and the time required to thusly charge the reference capacitor as a reference time interval value $t_r$; and"

Signed and Sealed this

Twenty-fourth Day of May, 1994

Attest:

Attesting Officer

BRUCE LEHMAN
Commissioner of Patents and Trademarks